(12) United States Patent
Flick

(10) Patent No.: US 9,598,232 B2
(45) Date of Patent: Mar. 21, 2017

(54) FOOD OR BEVERAGE CARD COMPRISING AN ACTUATOR

(71) Applicant: NESTEC S.A., Vevey (CH)

(72) Inventor: Jean-Marc Flick, Pomy (CH)

(73) Assignee: Nestec S.A., Vevey (CH)

(*) Notice: Subject to any disclaimer, the term of this patent is extended or adjusted under 35 U.S.C. 154(b) by 1 day.

(21) Appl. No.: 14/434,463

(22) PCT Filed: Oct. 11, 2013

(86) PCT No.: PCT/EP2013/071309
§ 371 (c)(1),
(2) Date: Apr. 9, 2015

(87) PCT Pub. No.: WO2014/057098
PCT Pub. Date: Apr. 17, 2014

(65) Prior Publication Data
US 2015/0266665 A1   Sep. 24, 2015

(30) Foreign Application Priority Data

Oct. 12, 2012 (EP) .................................. 12188389

(51) Int. Cl.
*B65D 85/804* (2006.01)
*A47J 31/40* (2006.01)
(Continued)

(52) U.S. Cl.
CPC ........ *B65D 85/8046* (2013.01); *A47J 31/407* (2013.01); *A47J 31/46* (2013.01);
(Continued)

(58) Field of Classification Search
CPC ............ B65D 85/8043; B65D 85/8046; B65D 85/804; B65D 35/22; B65D 35/242;
(Continued)

(56) References Cited

U.S. PATENT DOCUMENTS 6,264,065 B1    7/2001  Jouillat
6,347,725 B1 *  2/2002  Yoakim ................ B65D 85/804
                                                              222/107
(Continued)

FOREIGN PATENT DOCUMENTS

EP      1108656      6/2001
EP      1813333      8/2007
(Continued)

*Primary Examiner* — Michele L Jacobson
*Assistant Examiner* — Ericson M Lachica
(74) *Attorney, Agent, or Firm* — K&L Gates LLP

(57) ABSTRACT

The present invention relates to a Card for containing food or beverage ingredients comprising: a substantially planar and rigid base portion, at least two ingredient compartments for storing the ingredients and at least two discharge portions, each discharge portions being linked to one of the compartments and extending along the plane of the base portion, and at least one sealing member provided on the base portion covering the compartments and discharge portions on the base portion side of the card, wherein the card is designed for insertion in a food and beverage preparation device in order to dispense the ingredients from the compartments via the discharge portions. The invention further relates to a food and beverage preparation system, comprising a card according to the invention and a food and beverage preparation device, as well as to a method for preparing food or beverages using the card.

8 Claims, 14 Drawing Sheets

(51) Int. Cl.
  *A47J 31/44* (2006.01)
  *B65D 81/32* (2006.01)
  *A47J 31/46* (2006.01)

(52) U.S. Cl.
  CPC ......... *B65D 81/32* (2013.01); *B65D 81/3294* (2013.01); *B65D 85/804* (2013.01); *B65D 85/8043* (2013.01)

(58) Field of Classification Search
  CPC ........ B65D 35/28; B65D 25/08; A47J 31/407; A47J 31/40; A47J 31/46; A47J 31/00; A47J 31/44; A47J 31/06; A47J 31/0605; A47J 31/064; A47J 31/3642; B67D 2001/0821
  USPC ...................................................... 222/145.5
  See application file for complete search history.

(56) References Cited

U.S. PATENT DOCUMENTS

2009/0007796 A1    1/2009  Ricotti
2009/0314167 A1*  12/2009  De Graaff ............. A47J 31/405
                                                                    99/295

FOREIGN PATENT DOCUMENTS

FR          2369181         5/1978
WO       2011139149        11/2011

\* cited by examiner

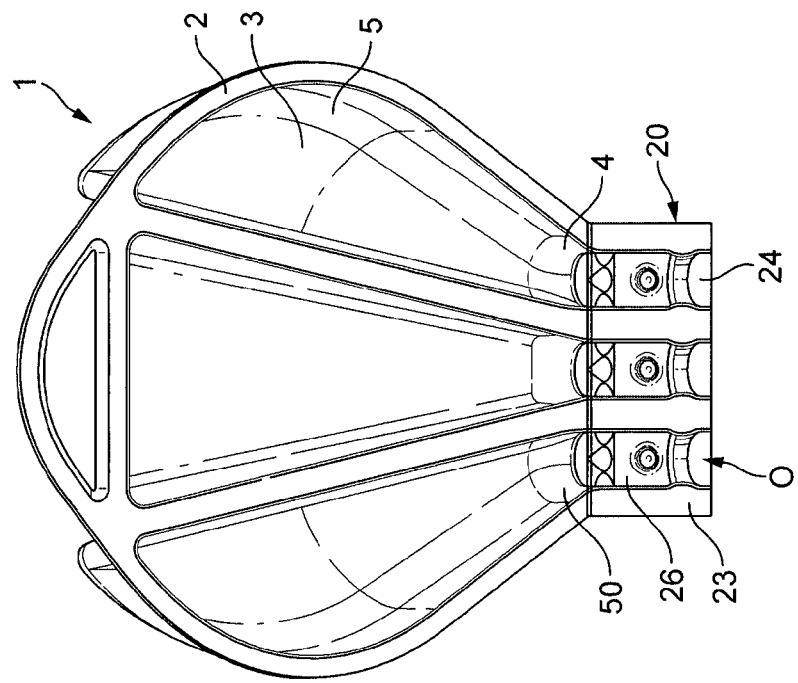
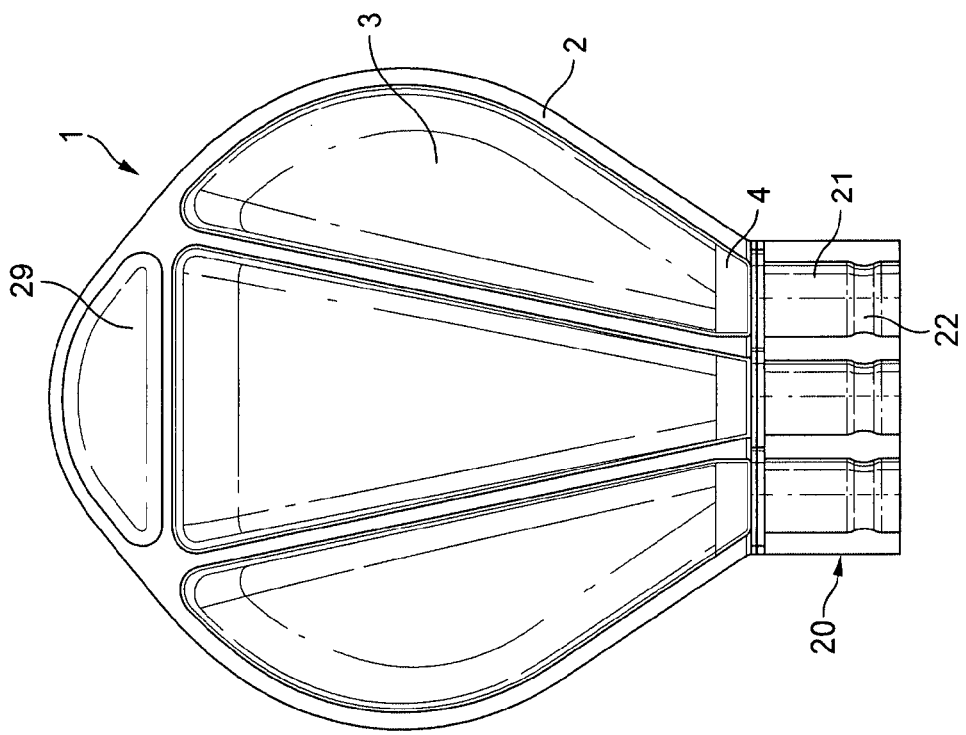

FOOD OR BEVERAGE CARD COMPRISING AN ACTUATOR

CROSS REFERENCE TO RELATED APPLICATIONS

The present application is a National Stage of International Application No. PCT/EP2013/071309, filed on Oct. 11, 2013, which claims priority to European Patent Application No. 12188389.6, filed on Oct. 12, 2012, the entire contents of which are being incorporated herein by reference.

FIELD OF THE INVENTION

The present invention relates to a card or cartridge for containing food or beverage ingredients, a food and beverage producing system comprising a card according to the invention and a food and beverage preparation device, and a method for producing a food or beverage using the card.

BACKGROUND OF THE INVENTION

The production of food or beverages like coffee by using a capsule containing the ingredients for the product to be dispensed is well known. In FIG. 12 a capsule 200 is shown having a capsule body 201 containing beverage ingredients. The capsule 200 is closed by a first membrane 202 and a second membrane 203. For producing a beverage, a water injection needle 210 of a corresponding beverage production device is inserted into the capsule 200 via the first membrane 202 and water is injected inside the capsule 200 to interact with the beverage ingredient in a dissolution phase. When being injected, the water creates an overpressure resulting in the second membrane 203 to open against a tearing surface (e.g. a pyramid plate) so that the beverage (i.e. the product) can be dispensed from the capsule 200 in a delivery phase as indicated by arrow 220.

Once the water is injected inside the capsule 200 it is not possible to stop the beverage production or otherwise influence the dissolution phase or the delivery phase. Moreover, when preparing complex beverages—like multi-layer beverages—several capsules are needed for the beverage production, wherein each capsule comprises a different ingredient (for a particular layer) of the beverage.

SUMMARY OF THE INVENTION

The present invention aims to improve on the above-mentioned drawbacks, and an object thereof is to provide a card for containing food or beverage ingredients, a food and beverage producing system as well as a method for producing a food or beverage which allow for a flexible preparation of complex (e.g. portioned or multi-layered) beverages or food in an easy and economic way.

The object is to be accomplished by means of the independent claims. The dependent claims advantageously study further the central idea of the invention.

According to a first aspect of the invention, there is provided a card for containing food or beverage ingredients according to claim 1.

The card comprises a planar and rigid base portion, at least two compartments for storing the food or beverage ingredients and a discharge portion (e.g. a channel) extending from each of the compartments and along the plane of the base portion, wherein at least one sealing member (e.g. a foil member or membrane) is provided on the base portion to cover all compartments and discharge portions, thus completely confining the openings of the compartments and discharge portions on the base portion side of the card. One sealing member covers all the openings, but depending on the needs in production (separate filling lines etc.), individual compartments can be closed by individual seals. The card is designed for insertion in a food and beverage preparation device in order to dispense the ingredients from the compartments via the discharge portions.

Both the compartments and discharge portions are formed by recesses protruding (preferably in the same direction) from the plane of the base portion. The term "recess" is to be understood as a protruding body projecting from the base portion, which protrusion is accessible via the base portion (through an opening therein) and forms a hollow member or cavity when covered by a sealing member being provided on the base portion.

Preferably, a liquid to be mixed with the ingredients is injected into the card on the base portion side, and the final product is dispensed, i.e. leaves the card, on a lateral side which forms angle of around 90° with respect to the base portion. In traditional systems such as the one shown in FIG. 12, the flow goes straight through the capsule, i.e. the angle between the liquid injection and the dispensing outlet is about 180°, thus not allowing a creation of sufficiently turbulent currents inside of the compartment or capsule to obtain an optimum dissolution and mixing.

However, the ingredients contained in the compartments can be dispensed directly out of the card, that is to say, without mixing with a liquid injected from the machine within said compartments. In such a case, the food or beverage product is formed by mixing the ingredients contained inside the compartments, at the time those ingredients are expelled from the card (inside a receiving container such as cup), or alternatively, by mixing the ingredients within a mixing chamber of the card, the thus formed food or beverage product being finally dispensed from the mixing chamber towards a receiving container (such as a cup or a bowl or similar container). In that case, when the ingredients contained in the card are not mixed with a mixing fluid injected therein, the machine preferably pierces the sealing member and injects a propelling medium such as a gas inside the card to expel the ingredients contained in the compartments outside of the card.

Further dispensing means are described hereafter, which allow the food or beverage preparation machine to dispense the ingredients contained in the compartments outside of the card.

According to a preferred embodiment of the present invention, the card for containing food or beverage ingredients is a capsule or cartridge to be used in a device for preparing a beverage, a soup or another food product.

As the card comprises a plurality of compartments, it is possible to prepare a complex beverage or food product by simply using one single capsule, wherein each compartment can hold a different ingredient for said complex product. This is due to the fact that the respective compartments can be selectively processed, e.g. by injecting a fluid (such as water or milk) into one compartment after the other for dissolution or at least dispensing purposes. It is also possible to dispense first parts of the product from one compartment, then from a second compartment, and then again from the first compartment, which is virtually impossible when different capsules for different ingredients are used. Therefore, the food or beverage preparation can be carried out in a very flexible way, as the dissolution in and dispensing from the respective compartments can be carried out and influenced individually. The present invention thus allows the preparation of layered products such as multi-layered soups, desserts or hot or cold beverages. Since all compartments and discharge portions are completely covered on the base portion side of the card, the production of the card is facilitated since only one sealing member is needed for sealing or at least closing a plurality of compartments. This is another advantage compared to a system using several capsules for complex products.

According to a preferred embodiment of the invention, at least some of the discharge portions of the card extend from the respective compartment to a common mixing chamber from which a further discharge portion (e.g. a mixing channel) extends along the plane of the base portion. Mixing of an ingredient with a liquid which is injected into the card can take place in the compartments themselves before dispensing, but the additional mixing chamber allows for an additional (or alternative) mixing or dissolving step, where the ingredients of particular compartments can be selectively mixed with a liquid in the mixing chamber before being dispensed, thus incorporating the functionality of a complex system into a single capsule. It is possible to mix only one ingredient from one compartment with a liquid or to mix several ingredients from different compartments with a liquid. In principle it is also possible to introduce different liquids into the card and to mix them with one or more ingredient in the mixing chamber. Both the mixing chamber and the mixing channel can be formed by recesses which protrude in the same direction from the plane of the base portion as the compartments and discharge portions of the card. Preferably, the mixing channel extends from the mixing chamber to a lateral end region of the base portion thus forming an outlet of the card.

Since each compartment or mixing chamber is linked to its own discharge portion or channel extending therefrom, it is possible to control the timing and order of the dispensing of the different ingredients. In order to allow such a control, at least one processing member which is interacting with at least one of the discharge portions can be provided. A processing member can for example be located in one of the discharge portions, or next to a discharge portion, for example in a mixing chamber. According to a preferred embodiment of the invention, one processing member is associated with each compartment and the discharge portion linked thereto.

The processing member can be a static mixer being arranged in a hollow portion of the card, preferably in at least one of the discharge portions or channels. Such a static mixer allows for a sufficient mixing of the ingredients to be dispensed and does at the same time also allow to create a foamy product, particularly when additionally a gas (e.g. air) is injected into the respective discharge portion, preferably upstream of the static mixer.

According to a preferred embodiment of the invention, the card comprises at least one flow processing element arranged in at least one discharge portion and being movable therein. The flow processing element can for example be a valve or a simple plug-like element arranged in a discharge portion such as to obturate it. Preferably, the flow control element comprises channels allowing the ingredients (either as such or already mixed with or dissolved in an injected liquid) to pass the discharge portions. The channels can be formed on the surface of the flow processing element, or inside. According to a further preferred embodiment the flow processing element comprises a piercing member for piercing of a closing means closing an inlet or an outlet of a discharge portion. For example, the compartments can be separated from the discharge portions by closing means, which are pierced by the piercing member when the content of the compartment is to be dispensed or to be led to a mixing chamber. To initiate the piercing and thus the dispensing or further mixing, the flow controlling element is moved along the discharge portion. The flow controlling element can for example be moved along the discharge portions by means of an actuation member protruding through the sealing member covering the base portion of the card.

The discharge portions preferably extend from the respective compartment or mixing chamber towards a lateral end region of the base portion thus forming an outlet of the card. The outlet of the card can be sealed off by a seal which is integrally formed with the sealing member covering the compartments, for example one foil or sheet can be used, simply being bent by an angle of approximately 90° to cover said outlet.

When the card comprises a mixing chamber, a flow controlling element can be provided in said mixing chamber having first piercing members extending into at least one or several of the discharge portions of the card towards closing means sealing the respective compartment off from the corresponding discharge portion of the card. The flow controlling element can further comprise a second piercing member extending into a further discharge portion downstream of the mixing chamber towards closing means sealing off an inlet or outlet of this further discharge portion. The flow controlling element can comprise an actuation member protruding therefrom through the sealing member such that at least one, preferably all closing elements sealing the compartments off from the discharge portions or channels of the card can be pierced by the first piercing members when moving the flow controlling element in a first direction along the plane of the base portion, and the closing element sealing off the inlet or outlet of the further discharge portion can be pierced by moving the flow controlling element in a second direction along the plane of the base portion. Preferably the first and the second direction are opposite to each other. It is thus possible to open a plurality of compartments by displacing one flow controlling element in one single step, while a displacement of the piercing member in the opposite direction results in the card, preferably the mixing chamber, being opened by piercing the sealing portion closing off the further discharge portion (i.e. the mixing channel). It is also possible that the flow controlling element can be moved in more than the before-mentioned first and second direction, wherein in each of the respective directions only one or a predefined number of sealing portions are pierced to open the respective discharge portions or channels.

The compartments, mixing chamber and discharge portions are preferably integrally formed with the base portion. Hence, the card can be produced in an easy and economic way. It is also possible that at least one of the compartments and/or the mixing chamber is made of a soft or flexible material, like a foil member, which is provided (preferably sealed) around an opening in the base portion being covered by the sealing member; the opening in the base portion passing into the space bordered by the foil member forms the recess, i.e. the compartment or mixing chamber. By using flexible compartments/mixing chamber instead of rigid compartments/mixing chamber, the food or beverage ingredients stored in the respective compartments or being mixed in the respective mixing chamber can be easily pressed or squeezed out of said recess by flattening or crushing the respective compartments/mixing chamber by means of a (mechanical push) actuator. By using mechanical forces to dispense the food or beverage ingredients, it is also possible to provide ingredients within the card or cartridge which cannot be dispensed when using other known standard principles; e.g. highly viscous ingredients.

Optionally, the discharge portions can comprise a clamping portion to be clamped by clamping means of a food and beverage preparation device to control the fluid flow through the respective discharge means. The discharge means can be channels formed in the card, a channel formed in a separate element assembled with the card, or a flexible or rigid tube linked to channels or recesses formed in the card.

It is for instance possible that discharge portions of the card pass into (preferably flexible) channels of a dispensing member extending from the base portion, preferably from a lateral end region of the base portion. The channels are preferably formed by tubes. It is, however, also possible that the channels are formed by recesses which protrude in the same direction from a plane of a base portion of the dispensing member, which recesses are then covered by a sealing member provided on the base portion thus completely confining the channels on the base portion side of the dispensing member. By means of said dispensing member there is provided a feature which can be manipulated (e.g. clamped or provided with additional processing members as described in the following) to actively control the fluid flow leaving the card.

The dispensing member preferably can have a connection portion being connected, preferably sealed, to the end region of the base portion. Hence, a secure connection between the base portion and the dispensing member can be provided while a closing means can be easily provided between the discharge portions and the channels by simply using a projection of the sealing member covering the base portion of the card. If such a closing means is provided accordingly, a flow controlling element can be provided which extends along the channels of the dispensing member. Said flow controlling element then preferably has a cross-section in order to fill the channels being confined by its walls and the sealing member of the dispensing member. Preferably, second channels are formed on or in the flow controlling element which second channels axially extend along the whole flow controlling element to allow for the ingredients to pass the dispensing member. The end of the flow controlling element at an upstream end thereof preferably comprises a piercing member for penetrating the closing means. The flow controlling element can thus be held in a fixed position within the channel. As the pressure inside the compartment and/or mixing chamber increases due to the injection of fluids (like water or air), the closing means deform (i.e. bulges). At a desired and predefined card pressure resulting in a corresponding deformation of the closing means, the closing means reaches the piercing member which thus pierces and opens the closing means thus allowing the ingredients or (intermediate) products to be dispensed (e.g. by pneumatic effect) from the card via the channels. The pressure rise inside the compartments/mixing chamber as well as the second channels of the piercing means results in an acceleration of the discharged ingredients or products. During discharge, the shear stress induced by the conjunction of the fluid velocity (induced by pressure in the compartments and/or in the mixing chamber) and the geometry of the flow controlling element has an influence on the texture of the product dispensed. If a static mixer or a similar processing element is present, this also has an impact on the product texture. The choice and design of the flow controlling element(s) and/or processing element(s) has thus an important impact on the foaminess, viscosity, and other texture properties of the end product.

In a preferred embodiment, the flow controlling element is also moveable along the respective channel of the dispensing member. In this case, the flow controlling element preferably comprises an actuation member radially protruding through the sealing member of the dispensing member to move the piercing means along the respective channel of said dispensing member. By such an active displacement of the piercing means, the moment at which compartments or outlets open, the duration of the opening, and the pressure at opening and/or closing can be more accurately controlled.

The channels of the dispensing member can comprise a clamping portion to be clamped by clamping means of a food and beverage preparation device to regulate or control or stop the fluid flow (of ingredients) through the respective channel by changing the cross-section of the channel. The dispensing means or the device can further comprise guiding means for guiding the clamping means substantially perpendicular to the longitudinal axis of the respective channel. It is thus possible to dispense the (intermediate) product or ingredients from a first compartment, then re-closing the tubes, for instance during a mixing process in the mixing chamber or during the preparation of an additional part of the product in another compartment, then re-opening the clamping means for dispensing the second portion of the product and so on. The different production steps can thus be easily and accurately controlled.

According to a further aspect of the invention, there is provided a food and beverage preparation system, comprising a card according to the invention and a food and beverage preparation device according to claim 10.

By means of the food and beverage preparation system according to the invention it is possible to prepare a complex product, like a multi-layered beverage or soup, by using just one single card or capsule having a plurality of compartments which can be selectively processed by means of dispensing means for selectively dispensing or even mixing (parts of) the product. A direct flow principle as known in the prior art can still be carried out when using the inventive system.

The beverage production device can comprise one or more of the following dispensing means: fluid injection means for injecting fluids into the card (preferably the channels, chambers or compartments), pusher means for selectively flattening the compartments or mixing chamber, regulating means for blocking the discharge means or channels via the sealing member, and clamping means for clamping the channels or tubes of the dispensing member. The beverage production device can also comprise an actuator means for moving the flow controlling element along the plane of the base portion of the card and/or the dispensing member. Further, a controlling means can be provided for selectively controlling the dispensing members and/or piercing means and/or piercing element. The diversity of the interaction of the device with the card enables a high number of possibilities to individually influence the preparation of a product to obtain a desired product by simply using one card (having a plurality of compartments) in one device.

According to a preferred embodiment, the food and beverage preparation device can further comprise an outlet being fluidly connected to the discharge portions or channels. However, it is also possible that the outlet is formed by the outlet of the discharge portions of the card or the mixing channel or the channels of a dispensing member being part of the card.

The beverage production device can further comprise a heating and/or cooling means adapted to be brought into contact with an outer surface of the card on the side opposite the sealing element, for selectively heating and/or cooling the card and thereby its content (i.e. the ingredient and/or (intermediate) product). The heat transfer can be enhanced by using a heat-conductive material for the compartments; e.g. aluminum (foil) and the like. The heating and/or cooling means can comprise a thermally conductive element having an adaptable shape which is brought into contact with an outer surface of the compartments of the card. The thermally conductive element can thus adapt to the irregular outer shape of the card. Such a heat conductive member can comprise a thermo-gel. Further, said thermally conductive element can be removable from the device so that it can be pre-heated or pre-cooled in a microwave or freezer before being used in the device.

The card is is typically discarded after its use in the device (e.g., recycled, composted or incinerated). The term "card" which is used throughout the present application is not to be understood as limiting and does not imply that the card has to be rigid or have certain shape—terms such as "capsule", "pod", "pad", "cartridge" or "sachet" can be used in the same way. The card 1 can be a single use product to be sold as such, or a refillable item where the compartments 3 are filled with ingredients by the user to prepare a card just before use.

According to a further aspect of the invention, there is provided a method for preparing a food or beverage product according to claim 16.

Further features, advantages and objects of the present invention would come apparent for the skilled person when reading the following detailed description of embodiments of the present invention, when taken in conjunction with the figures of the enclosed drawings.

DETAILED DESCRIPTION OF THE INVENTION

FIGS. 1 to 11 do all show a card 1 for containing food or beverage ingredients (in the following also referred to as "ingredients") according to the present invention. Said ingredients can be any suitable ingredients to prepare a complex beverage or liquid/viscous food, such as a multi-layer beverage (e.g. coffee plus creamer, milk or milk froth, multi layered hot or cold dairy drinks) or soup or another food product. The ingredients can for example be soluble coffee or tea, cocoa, milk or milk powder, soup powder, infant formula, nutrition products catering specific needs, and combinations thereof. In addition or instead of powdered ingredients, liquid or gelified concentrates can also be used. IN particular for the preparation of meals such as soups, infant meals, meals for people having specific dietary needs, the ingredients can comprise powdered, liquid or gelified ingredients which are soluble and non-soluble pieces such as herbs, freeze-dried vegetables and the like.

Figure 12:
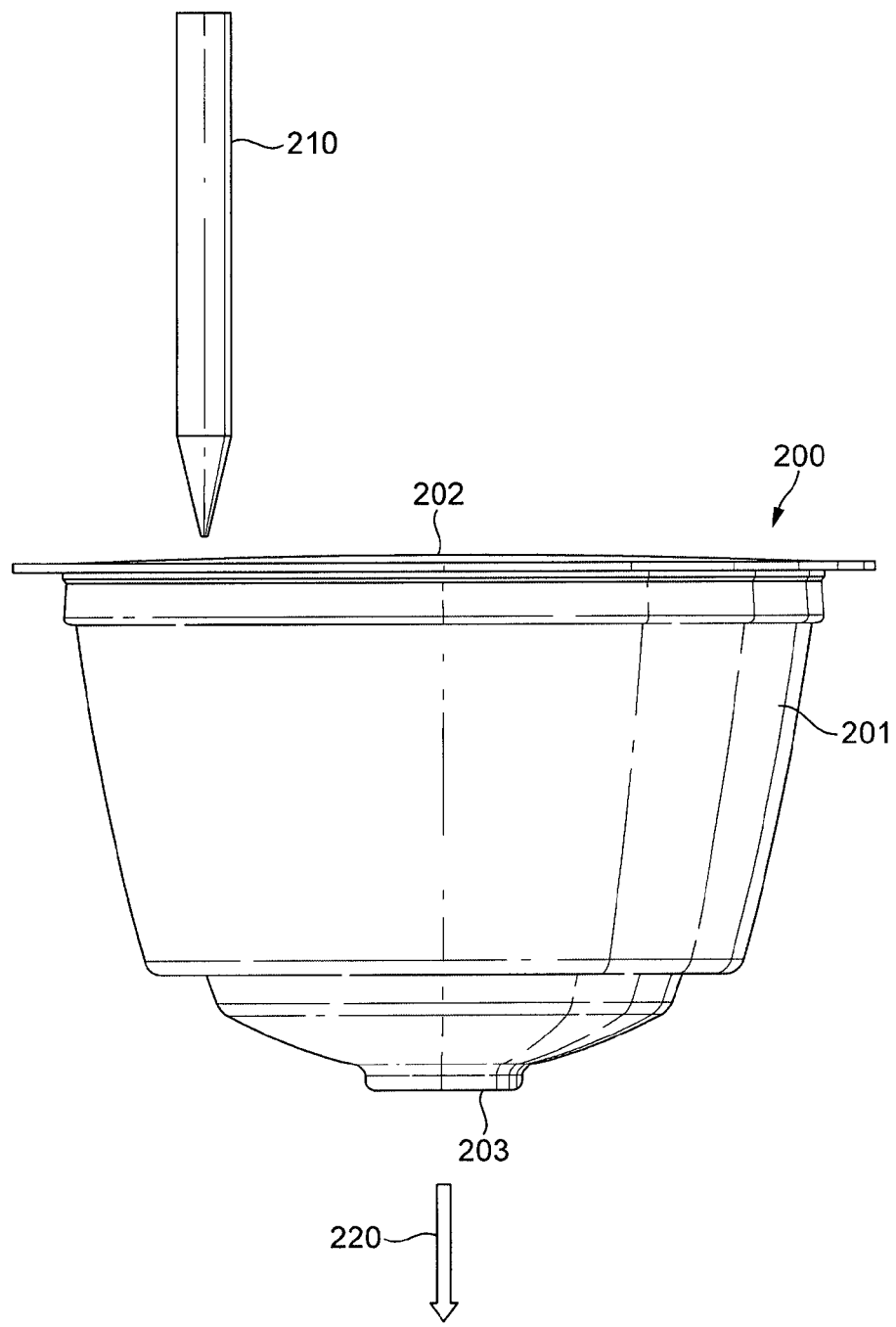
FIG. 12 shows a known beverage producing system comprising a known capsule.

The card 1 comprises a substantially planar base portion 2 being made of a rigid material. "Rigid" means that the base portion 2 remains its flat or planar layout (particularly during product preparation) and is at most elastically deformable. The base portion 2 is preferably made of plastics or another rigid material; e.g. aluminum or the like. The card 1 or better the base portion 2 can have a square or rectangular basic form thus producing much less waste during the production of the card 1 in comparison with a production of a round capsule as shown in FIG. 12. However, the base portion 2 can have any desired shape, while the choice for said shape can depend upon the desired design of the packaging and/or technical constraints.

The card 1 further comprises at least two compartments 3 for storing the ingredients. In the embodiments there are shown cards 1 having three compartments 3, while the invention is not limited thereto. The compartments 3 are formed by recesses which do all protrude in the same direction from the plane of the base portion 2. The compartments 3 can be integrally formed with the base portion 2. Alternatively, at least one of the compartments 3 can be made of a flexible (foil) member, e.g. an aluminum foil. Said foil member is then provided, preferably sealed, around an opening 30 in the base portion 2. The opening 30 in the base portion 2 passes into the space bordered by the foil member (or compartment wall 31) to form the recess, i.e. the compartment 3.

From each of the compartments 3 extends a discharge portion 4 along the plane of the base portion 2. The discharge portions 4 are fluidly connected with the compartment 3 at an upstream end thereof and an outlet O of the card 1 at a downstream end thereof. Like the compartments 3, also the discharge portions 4 are formed by recesses which protrude in the same direction from the plane of the base portion 2; i.e. like the compartments 3. The discharge portions 4 of the card 1 are preferably integrally formed with the base portion 2. At least one of the discharge portions 4 can be formed as a channel.

The card 1 further comprises at least one sealing member 5 which is provided (e.g. sealed) on the base portion 2 to cover all compartments 3 or openings 30 and discharge portions (e.g. channels) 4 thus completely confining the openings 30, 40 of the compartments 3 and discharge portions 4 on the base portion side of the card 1. The sealing member 5 is preferably made of an aluminum or PET membrane, but the invention is not limited thereto. Although here an embodiment with one sealing member 5 covering the complete base portion side of the card is shown, it should be noted that each compartment can be sealed individually on a production line. This may in particular be advantageous when the compartments are filled with different types of ingredients (e.g. powder, concentrate or jelly).

Figure 1A:
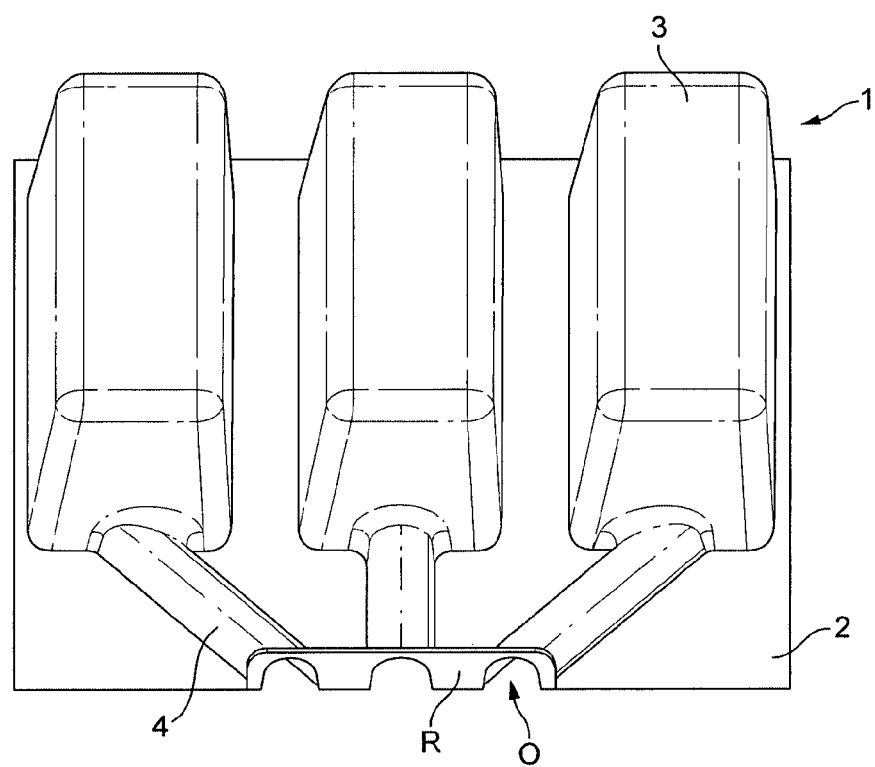
FIG. 1a shows a perspective top view of a card according to a first embodiment of the present invention.
Figure 1B:
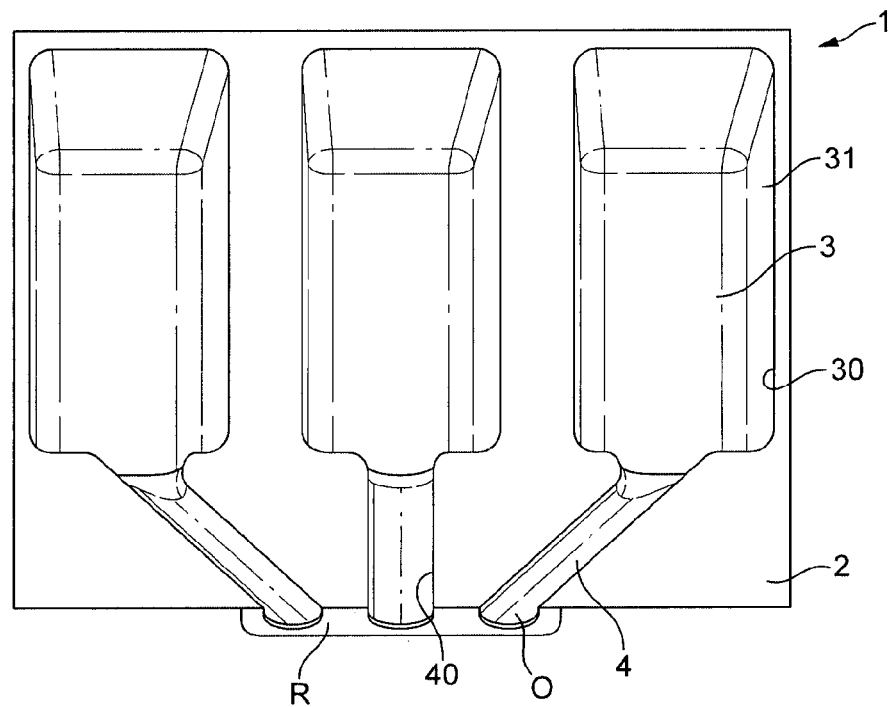
FIG. 1b shows a perspective bottom view of the card according to FIG. 1a, FIG. 2a shows a perspective bottom view of a card according to a second embodiment of the present invention.

According to one embodiment as depicted in FIGS. 1a and 1b, the discharge portions or channels 4 of the card 1 extend from the respective compartment 3 towards a lateral end region R of the base portion 2 thus forming the outlet O of the card 1 for dispensing the product or at least a part thereof.

Figure 3A:
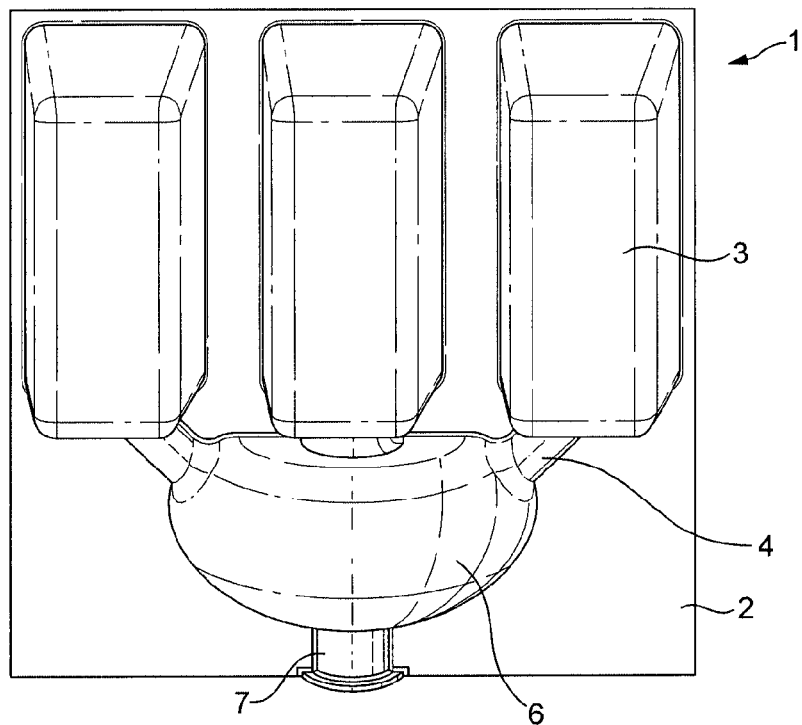
FIG. 3b shows a perspective bottom view of the card according to FIG. 3a, FIG. 4a shows a perspective top view of a card according to a forth embodiment of the present invention.
Figure 3B:
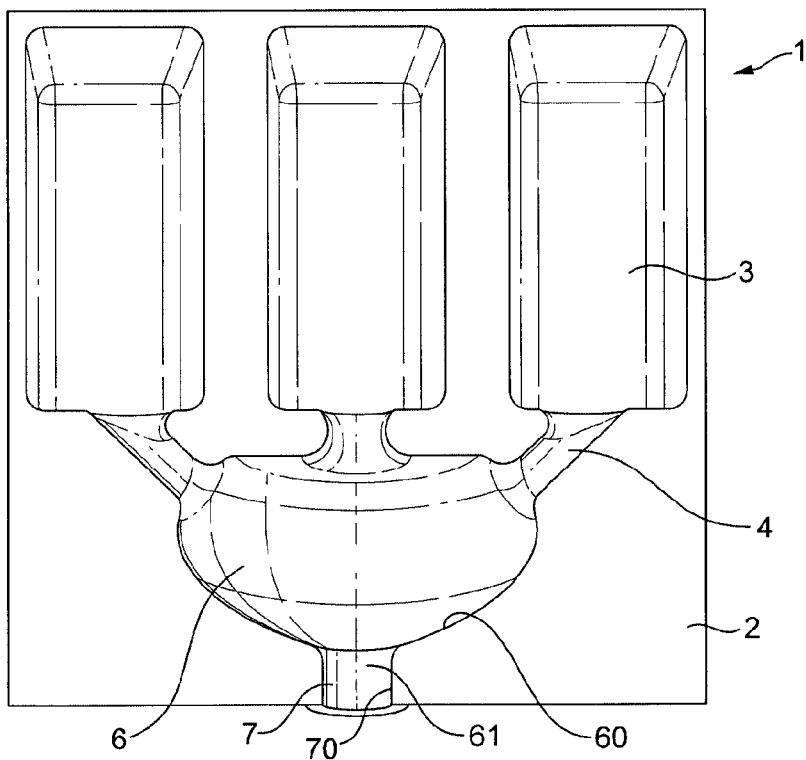

According to another embodiment as depicted in FIGS. 3a and 3b, the discharge portions 4 of the card 1 extend from the respective compartment 3 towards and up to a common mixing chamber 6. The discharge portions 4 thus fluidly connect the respective compartment 3 with the common mixing chamber 6. Like the discharge portions 4 of the card 1, a further discharge portion (e.g. a mixing channel) 7 extends from the mixing chamber 6 along the plane of the base portion 2 and preferably towards and up to a lateral end region R of the base portion 2 thus forming the outlet O of the card 1. Alike the compartment 3 and discharge portions 4 of the card 1, also both the mixing chamber 6 and the further discharge portion or mixing channel 7 are formed by recesses which protrude in the same direction from the plane of the base portion 2. The only sealing member 5 also covers the mixing chamber 6 and the further discharge portion 7 thus completely confining their respective openings 60, 70 on the base portion side of the card 1.

A processing member can be provided in at least one of the discharge portions 4, 7 covered by the sealing member 5. In other words, the processing member is placed within the respective discharge portion 4, 7 and is also covered by the sealing member 5 and thus sandwiched between the discharge portion 4, 7 and the sealing member 5. Alternatively, the processing member can also be provided to interact with at least one of the discharge portions 4, 7 covered by the sealing member 5, e.g. as a part of a food and beverage preparation device D described later herein.

Figure 5A:
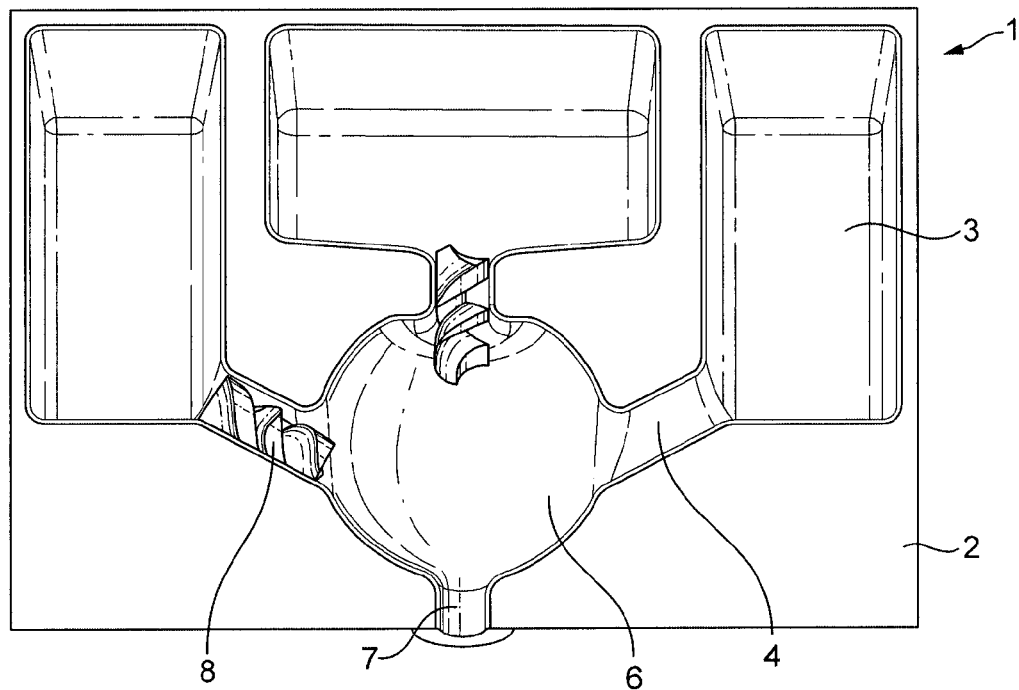
FIG. 5b shows a static mixer according to the fifth embodiment as shown in FIG. 5a, FIG. 6a shows a top view of a card according to a sixth embodiment of the present invention.
Figure 5B:
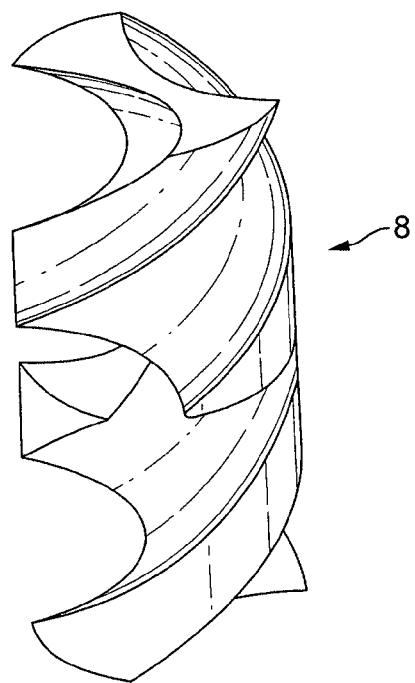

For instance, the processing member can be a static mixer 8 as depicted in the embodiment of FIG. 5a. A possible layout for such a static mixer 8 is also shown in FIG. 5b. By means of the static mixer 8 it is possible to sufficiently mix the ingredients passing through the respective discharge portion 4, 7. Further, (pressurized) air can enter or be injected via the sealing member 5 into the discharge portion 4, 7 comprising the static mixer 8, preferably at an upstream end of the static mixer 8, to create a foamy product due to the air injected into the preferably liquid ingredients or (intermediate) product passing the preferably channel-like discharge portion 4, 7. The static mixer 8 can be placed in at least one or more or preferably all the discharge portions 4 of the card 1. Additionally or alternatively, the static mixer 8 can also be provided within the further discharge portion (i.e. the mixing channel) 7.

Figure 2A:
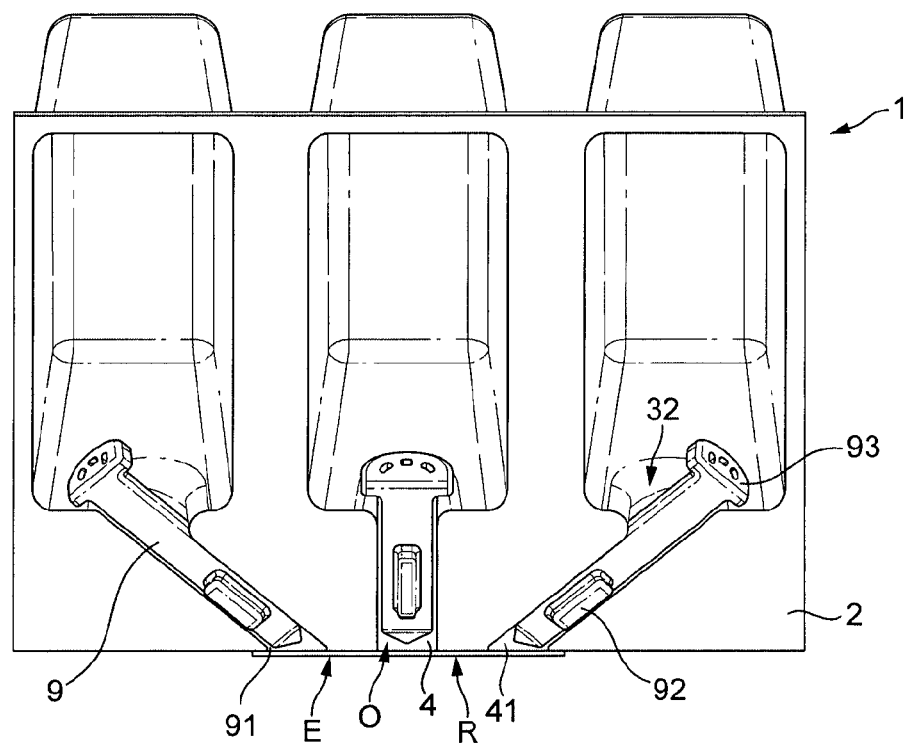
FIG. 2b shows a schematic view of a sealing member for a capsule according to FIG. 2a, FIG. 2c shows a piercing means according to the second embodiment as shown in FIG. 2a, FIG. 3a shows a perspective top view of a card according to a third embodiment of the present invention.
Figure 2B:
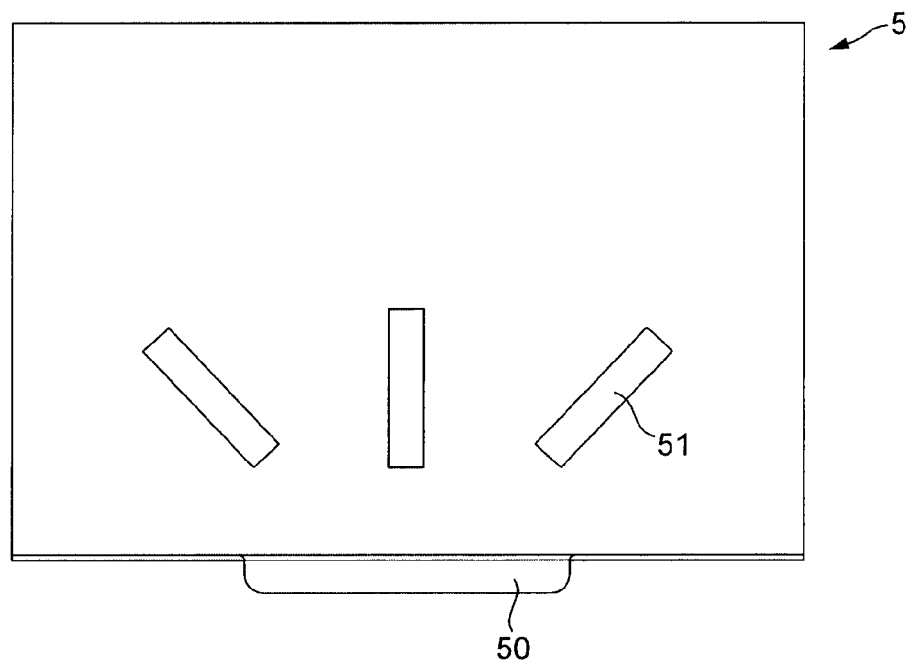
Figure 2C:
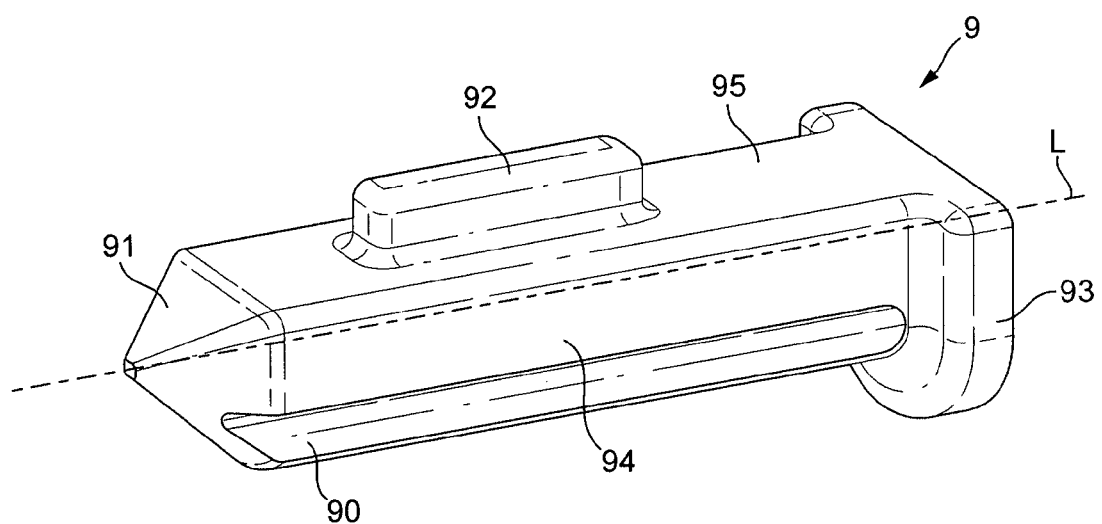

According to another embodiment as depicted in FIG. 2a, the processing member can also be a flow controlling element 9. As can be seen in FIG. 2a, the flow controlling element 9 extends along the respective discharge portion or channel 4 of the card 1 and is also moveable along said discharge portion 4; i.e. in a longitudinal direction thereof. The flow controlling element 9 preferably comprises a cross-section in order to fill (in a plug-like manner) the discharge portion or channel 4 of the card 1 being confined by the channel or discharge portion walls 41 and the sealing member 5. As can be seen in FIGS. 2a and 2c, the flow controlling element 9 thus comprises a semi-circular body 94 to associate with the discharge portions 4, 7, wherein the body 94 has a flat top portion 95 to be in contact with the sealing member 5.

According to a preferred embodiment, second channels 90 are formed on or in the piercing means 9. As can be seen in FIG. 2c, the second channels 90 actually extend along the whole flow controlling element 9 (along its longitudinal axis L) to allow the ingredients stored in the compartments 3 to pass the discharge portions 4 of the card 1 via said second channels 90. This, however, can also be obtained by a flow controlling element 9 having a smaller diameter than the respective discharge portion 4, 7. The diameter of the channel in the flow controlling element 9 depends on the size of the particles that have to pass through and the shear stress that is required. The smaller the cross section of the channel or channels is, the higher the velocity of the fluid and the shear stress induced in the beverage product will be. The shear stress has an important impact on the final texture of the product.

The end of the flow controlling element 9—preferably the end opposite to the compartment 3 or better at a downstream end of the flow controlling element 9—comprises a piercing member 91 for penetrating a closing means 50 closing off an opening O of the discharge portions 4 of the card 1 (which can be identical to an opening O of the card 1)—preferably an opening O opposite to the respective compartment 3 or better at a downstream end of the discharge portion 4. In case the discharge portions 4 extend from the compartment 3 up to the lateral end region R of the base portion 2 thus forming an outlet O of the card 1, the closing means 50 can be formed as an integral part of the sealing member 5. With respect to FIG. 2b, the sealing member 5 can thus comprise a prolongation 50 which is bent at the edge E of the base portion 2 (e.g. by an angle of 90°) to cover the lateral end region R and thus also the outlet(s) O of the card 1. Alternatively, two different sealing membranes can be used for respectively sealing the compartments where the fluid will be injected, and the outlet. These two membranes can have different mechanical properties.

In case of the embodiment according to FIG. 3a, the respective discharge portions or channels 4 can also be closed off by a sealing portion preferably at an end close to the mixing chamber 6, which sealing portion can then be pierced by a flow controlling element 9 being placed in the respective discharge portions 4 to open the respective compartment 3. Moreover, the flow controlling element 9 can also be placed within the mixing channel 7 adapted to pierce a sealing portion preferably provided at an end close to the outlet O of the card 1 to open the card 1.

According to a preferred embodiment, the flow controlling element 9 comprises an actuation member 92 radially protruding through the sealing member 5 to move the flow controlling element 9 along the respective discharge portion 4, 7. In other words, the actuation member 92 extends from the flow controlling element 9 in a substantially orthogonal direction with respect to the moveable direction or longitudinal axis L of the piercing means 9; the flow controlling element 9 is then placed in the respective discharge portion 4, 7 such that the actuation member 92 projects from the card 1 via the opening 40, 70 and the sealing member 5 covering said opening 40, 70. It is thus possible to move the flow controlling element 9 from an outside, e.g. by an actuator means of a food and beverage preparation device D (in the following also referred to as "preparation device" or "device") (see FIGS. 9a and 9b), when the card 1 is inserted in said device D. The position of the flow controlling element 9 in the discharge portion 4 as shown in FIG. 2a thus shows an initial position before piercing or penetrating the closing means 50 or sealing portion. When moving the flow controlling element 9 via the actuation member 92 towards the closing means 50, said closing means 50 will be penetrated by the piercing member 91 of the piercing means 9. The delivery of ingredients or (intermediate) products from the compartment 3 or mixing chamber 6 via the respective discharge portions or channels 4, 7 is obtained via the second channels 90 provided in the piercing member 9 forming a fluid connection between the upstream end and the downstream end of the respective discharge portion 4, 7.

According to a preferred embodiment, the flow controlling element 9 comprises a radially extending head portion 93 which is positioned within the compartment 3/mixing chamber 6 and distant to the outlet 32, 61 of the compartment 3/mixing chamber 6 passing into the discharge portion 4, 7 in the initial position of the piercing means 9. The broadened head portion 93 has a bigger diameter than the discharge portion 4, 7 thus being used as a stopper to avoid the flow controlling element 9 to slide out of the card 1. To still allow the ingredients passing along the second channels 90 when the piercing member 9 has penetrated the closing means 50 or sealing portion and the head portion 93 rests on the outlet 32, 61 of the compartment 3/mixing chamber 6, the second channels 90 extend through the head portion 93 of the piercing means 9.

However, according to another particular embodiment not shown in the figures, the second channels 90 do not pass the head portion 93 of the piercing means 9. According to said embodiment, the flow controlling element 9 can be moved from its initial position as shown in FIG. 2a to an intermediate position in which the piercing member 9 has penetrated the closing means 50 or sealing portion while the head portion 93 does not rest on the inner surface or outlet 32, 61 of the compartment 3/mixing chamber 6. In this intermediate position, the ingredients or (intermediate) products can pass through the discharge portions 4, 7 via the second channels 90. In a blocking position, the flow controlling element 9 is further moved until the head portion 93 rests on the inner surface or outlet 32, 61 of the compartment 3/mixing chamber 6 thus closing off the compartment 3/mixing chamber 6 from the discharge portions 4, 7 and the second channels 90. Hence, the disposal of ingredients from the respective compartment 3 or the mixing chamber 6 is inhibited. When again moving the flow controlling element 9 into its intermediate position, the flow of ingredients from the respective compartment 3 or the mixing chamber 6 via the channels 4, 7 is again enabled.

Figure 4A:
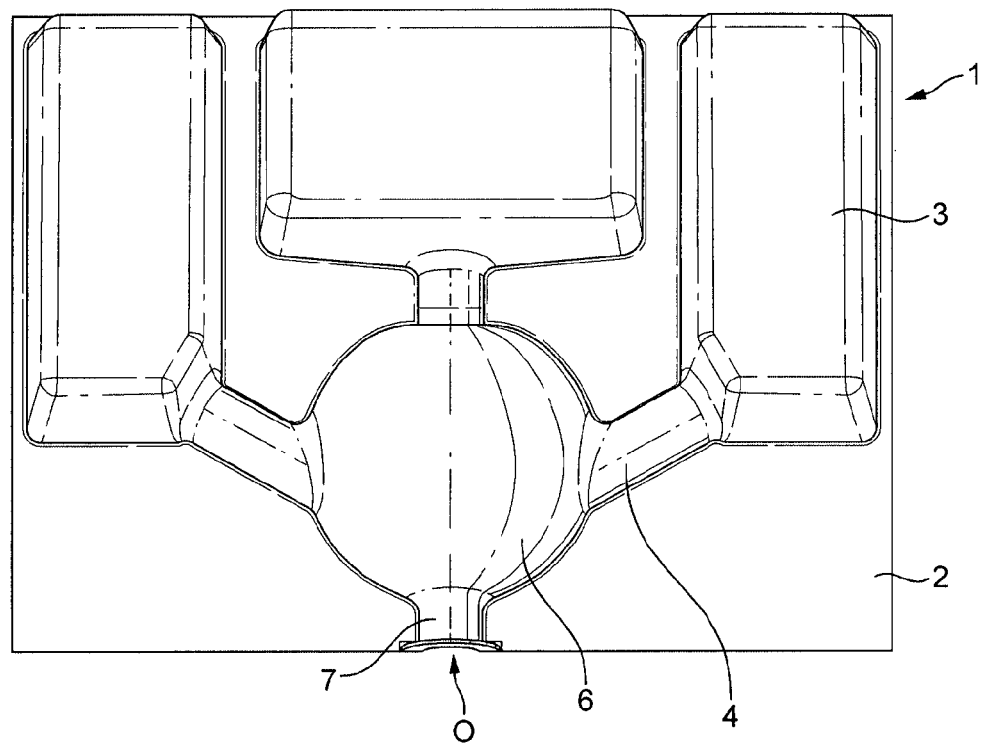
FIG. 4b shows a perspective bottom view of the card according to FIG. 4a, FIG. 5a shows a perspective bottom view of a card according to a fifth embodiment of the present invention.
Figure 4B:
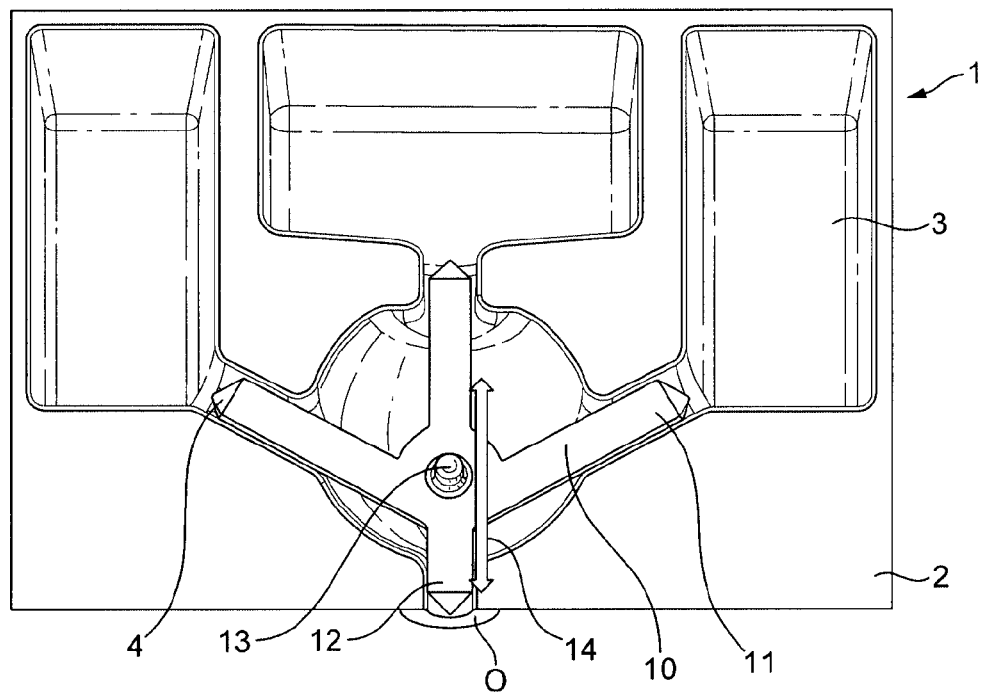

According to still another embodiment as depicted in FIGS. 4a and 4b, the processing member can be a flow controlling element 10 which is provided in the mixing chamber 6. Said flow controlling element 10 preferably has first piercing members 11 extending into the respective discharge portions 4 of the card 1. The flow controlling element 10 can further comprise a second piercing member 12 extending into the further discharge portion or mixing channel 7. In this embodiment, the compartments 3 are sealed off from the discharge portions 4 of the card 1 or the mixing chamber 6 by means of a sealing portion. The outlet O of the mixing channel 7 is also sealed off by means of a corresponding sealing portion or the closing means 50 of the sealing member 5.

The flow controlling element 10 may comprise an actuation member 13 radially protruding through the sealing member 5 such that at least one, preferably all sealing portions sealing the compartments 3 off from the respective discharge portions 4 of the card 1 can be pierced by the first piercing members 11 by moving the flow controlling element 10 in at least a first direction along the plane of the base portion 2. It is, however, also possible that the flow controlling element 10 can be moved into more than said one first direction along the plane of the base portion 2 to allow a selective (e.g. grouped or subsequent) opening of the respective sealing portions.

When moving the flow controlling element 10 in a second direction along the plane of the base portion 2, the sealing portion sealing off the outlet O of the further discharge portion or mixing channel 7 can be pierced. It is thus possible to expel the mixed ingredients or intermediate product from the mixing chamber 6. The first and second piercing members 11, 12 can be designed such that they close off the respective discharge portions or channels 4, 7 in a particular position while allowing a fluid or the like to pass through the respective discharge portions 4, 7 in a particular other position of the piercing element 10, e.g. by providing channels within the piercing element 10 as also demonstrated with respect to the flow controlling element 9 as depicted in FIG. 2c.

According to a preferred embodiment, the first direction and the second direction are preferably opposite to each other (see arrow 14 in FIG. 4b) thus facilitating the movement of the piercing element 10 and thus of a corresponding actuator means of a production device D. Further, the piercing element 10 is preferably made of a plastic material to allow an elastic deflection of the respective piercing members 11, 12 when moving the piercing member 10 in a direction other than the longitudinal extension of the piercing members 11, 12. Hence, by means of said embodiment, the respective compartments 3 can be opened by displacing the piercing element 10 in one single (first) direction while the product which has been mixed within the mixing chamber 6 can then be dispensed from the card 1 by simply displacing the piercing element 10 into the opposite (second) direction.

Dependent on the fluidity of the respective ingredients stored in the compartments 3, said ingredients can be controlled to enter the mixing chamber 6 either by a selective or sequential penetration of the respective sealing portion or by a (subsequent) selective injection of a fluid (e.g. air or water) in the respective compartments 3 in case the sealing portion has already been penetrated.

Figure 6A:
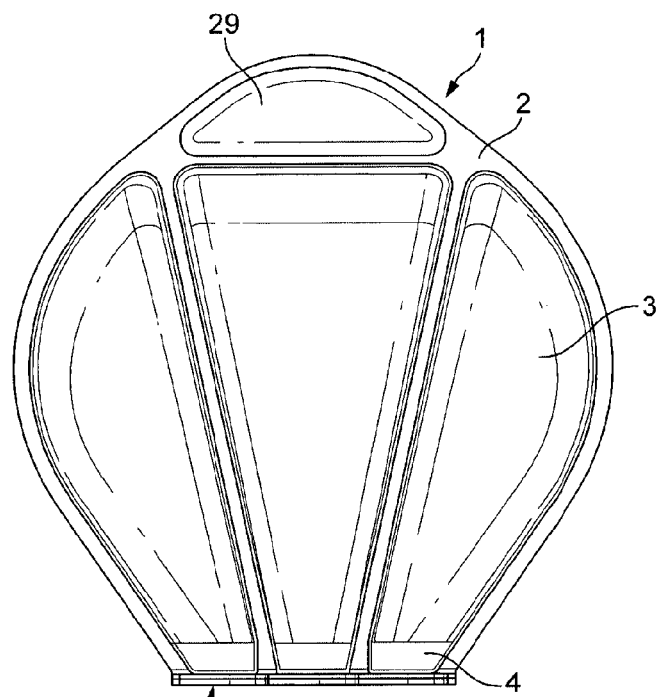
FIG. 6b shows a perspective view of a card according to FIG. 6a, FIG. 6c shows a side view of a card according to FIG. 6a, FIG. 7a shows a top view of a card according to FIG. 6a including a dispensing member.
Figure 6B:
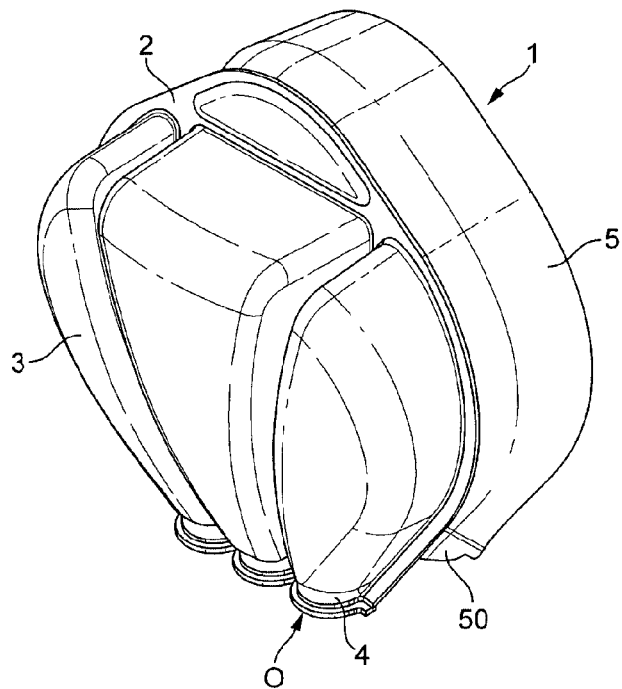
Figure 6C:
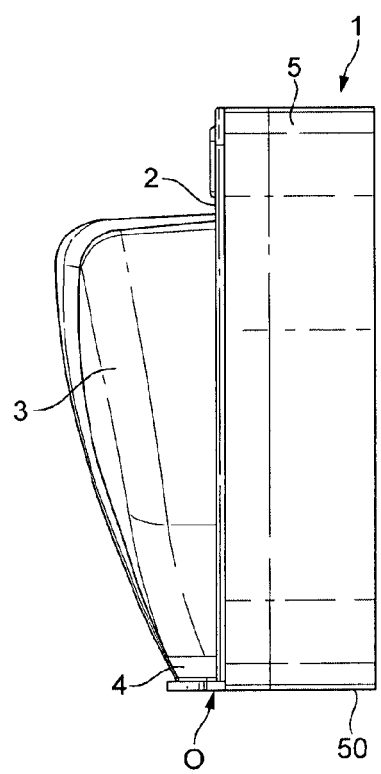

According to still another embodiment as depicted in FIGS. 6a to 6c, there is provided a card 1 according to the invention. The shown card 1 comprises three compartments 3; but the invention is not limited to said number of compartments 3. The discharge portions 4 do all extend from the respective compartment 3 towards and up to the lateral end region R of the base portion 2 thus forming an outlet O. The card 1 may also comprise a mixing chamber 6 which discharge portion 7 can also extend towards and up to the lateral end region R of the base portion 2 to form an outlet O of the card 1. The compartments 3 as well as the corresponding discharge portions 4 are all covered by the sealing member 5. Preferably, also the outlet O is covered by a prolongation 50 of the sealing member 5 as can be clearly seen in FIGS. 6b and 6c. However, the outlet O can also be covered by a separate closing means.

The card 1 as shown in FIG. 6 can further comprise a dispensing member 20 having channels 21, preferably flexible channels or the channels 21 at least having a flexibly deformable portion 22; this is shown in FIGS. 7 and 8. The dispensing member 20 is arranged or attached to the base portion 2 such that the discharge portions 4 of the card 1 or the further discharge portion 7 pass into the channels 21 of said dispensing member 20. Preferably, the channels 21 thus extend from the lateral end region R of the base portion 2. The dispensing member 20 preferably has a connection portion 25 being connected, preferably sealed, to the lateral end region R of the base portion 2. For connecting dispensing member 20 to the lateral end region R, thermal or ultrasonic soldering means can be used.

The channels 21 can be formed by (flexible) tubes (not shown), respectively, which each extend from the base portion 2, particularly from an outlet or outlets O of the card 1 at the lateral end region R of the base portion 2. The tubes can each be simply inserted in or fitted on the respective discharge portion 4, 7, particularly at an end thereof forming the outlet O of the card 1.

Alternatively, the channels 21 can be formed by recesses which protrude in the same direction from a plane of a base portion 23 of the dispensing member 20. The base portion 23 of the dispensing member 20 is preferably made of the same material as the base portion 2 of the card 1 and these two base portions preferably extend in the same plane. The channels 21 do also preferably extend in the same direction (with respect to said common plane of the respective base portions 2, 23) as the recesses of the base portion 2 of the card 1.

The recesses of the dispensing member 20 are also preferably covered by a sealing member 24 provided on the base portion 23 thus completely confining the channels 21 on the base portion side of the dispensing member 20. In a particular embodiment, the sealing member 24 can be formed by the projection 50 of the sealing member 5 of the card 1. The sealing member 24 is preferably made of the same material as the sealing member 5.

When a closing means 50 (preferably a prolongation 50 of the sealing member 5) is provided between the discharge portions 4, 7 and the dispensing member 20 as described above, the compartments 3 and/or mixing chamber 6 are hermetically separated from the channels 21. The flow controlling element can then be a piercing means 26 extending along the respective channels 21 of the dispensing member 20. Said piercing means 26 then preferably has a cross-section in order to fill the channels 21 being confined by its walls 27 and the sealing member 24 of the dispensing member 20. Preferably, channels 260 are formed on or in the piercing means 26 which channels 260 axially extend along the whole piercing means 26 to allow for the ingredients to pass the dispensing member 20. The end of the piercing means 26 at an upstream end thereof preferably comprises a piercing member 261 for penetrating the closing means (50 in FIGS. 7b and 8c). The piercing means 26 are preferably held in a fixed position within the channel 21. As the pressure inside the compartment 3 and/or mixing chamber 6 increases due to the injection of fluids (like water or air), the closing means 50 deforms (i.e. bulges) towards the piercing means, particularly towards its piercing member 261. At a desired and predefined pressure inside the card 1 or respective compartment 3 or mixing chamber 6 resulting in a corresponding deformation of the closing means 50, the closing means 50 reaches to the piercing member 261 which thus pierces and opens the closing means 50 thus allowing the ingredients or (intermediate) products to be dispensed from the card 1 via the channels 21 to an outlet O of the card 1 at a downstream end of the channels 21. The pressure inside the compartments 3/mixing chamber 6 as well as the channels 21 of the dispensing member 20 result in an acceleration of the discharged ingredients or products. When accordingly designing the piercing means 26 or its channels 260, shear stresses can be further increased thus enabling a change in the texture of the dispensed product, e.g. foaming or increasing viscosity. It is noted that the piercing means 26 can be designed in a similar or identical way as the flow controlling element 9 described above.

In a preferred embodiment, the piercing means 26 is also moveable along the respective channel 21 of the dispensing member 20. In this case, the piercing means 26 preferably comprises an actuation member 262 radially protruding through the sealing member 24 of the dispensing member 20 to move the piercing means 26 along the respective channel 21 of said dispensing member 20. Hence, as already explained above, the timing and the pressure to be reached for opening the card 1 can be more accurately influenced by actively displacing the piercing means 26.

It is noted that a static mixer 8 as described above can also be placed within at least one of the channels 21. It is also possible that the piercing means 26 with its channels 260 is formed as a static mixer. The same also applies for the flow controlling element 9 or piercing element 10.

According to still another embodiment, the channels 21 of the dispensing member 20 comprise a clamping portion which is the flexibly deformable portion 22 to be clamped by clamping means 140 of the device D to regulate or control or stop the fluid flow (of ingredients) through the respective channel 21 by changing the cross-section of the channel 21. As can be seen in FIGS. 8b and 8c, there can be provided one clamping means 140 for each of the channels 21 of the dispensing member 20 which can be individually or collectively activated; dependent on the product to be produced and the desired layering effect of said product. However, one or more channels 21 can also share a clamping means 140. The dispensing means 20 or the production device D can further comprise guiding means 28 for guiding the clamping means 140. Therefore, the guiding means 140 preferably comprise guiding grooves 280 to allow the guiding means 140 to be displaced in a direction substantially perpendicular to the longitudinal axis of the respective channel 21. The guiding grooves 280 are preferably positioned above or in front of the deformable portion 22.

By using said clamping means 140, preferably provided within a production device D, the respective (flexible) channels or tubes can be selectively clamped to thus individually and continuously control the flow of ingredients or products to be dispensed.

With respect to FIG. 8c, the clamping means 140 can also be used in combination with a static or preferably moveable piercing means 26. When pressing the clamping means 140 onto the deformable portion 22, the moveable piercing means 26 can at the same time be moved towards the closing means 50 due to the deformation of the channel 21 thus opening the respective discharge portion 4, 7 while at the same time closing the channel 21 which is then in a condition ready for selective dispensing of the product.

Figure 7C:
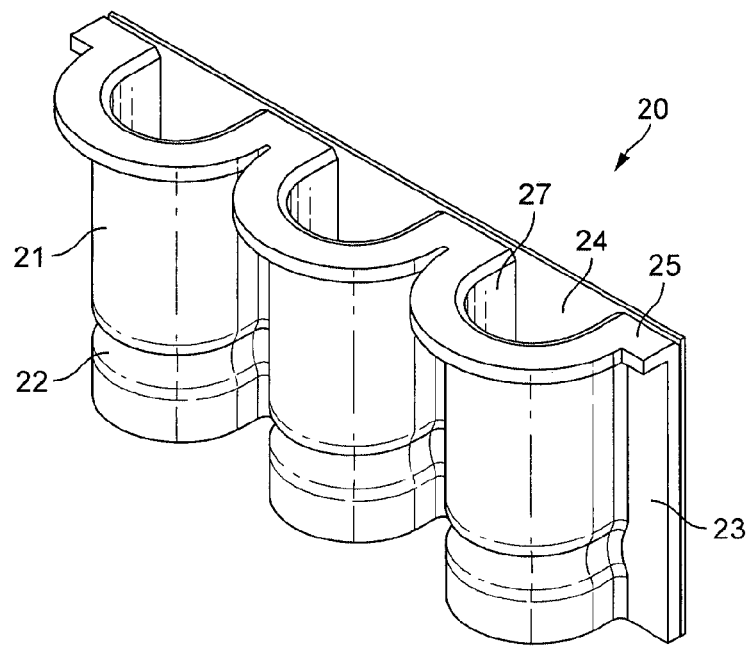
FIG. 7c shows a perspective view of a dispensing member of a card according to FIG. 7a, FIG. 7d shows a front and side views of a dispensing member according to FIG. 7c.
Figure 7D:
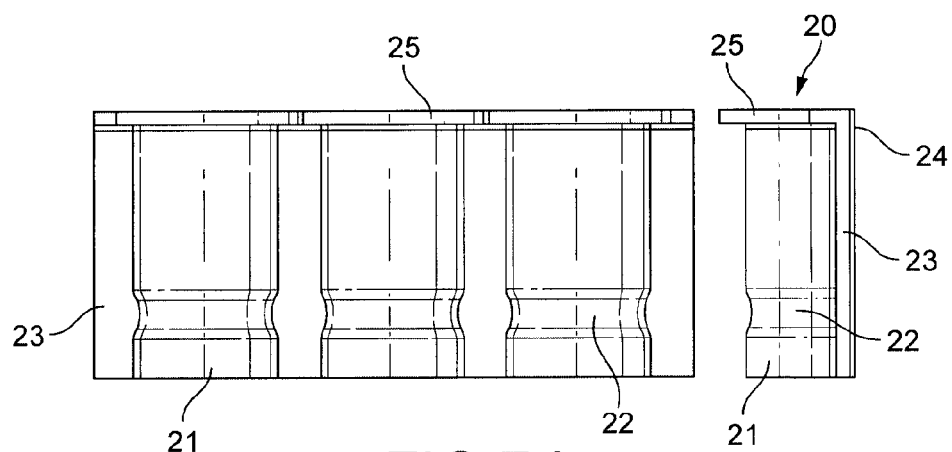
FIG. 7b shows a perspective bottom view of a card according to FIG. 7a also showing piercing means.
FIG. 7e shows a perspective top view of a piercing means of a card according to FIG. 7b.
FIG. 7f shows a perspective bottom view of a piercing means according to FIG. 7e.
Figure 7E:
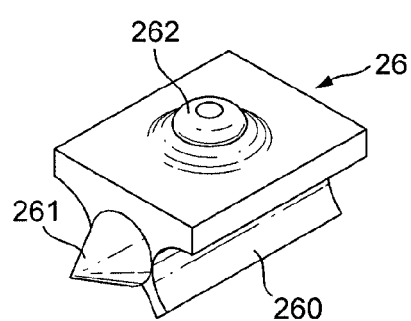
Figure 7F:
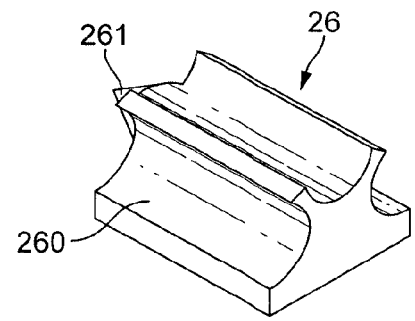
Figure 8A:
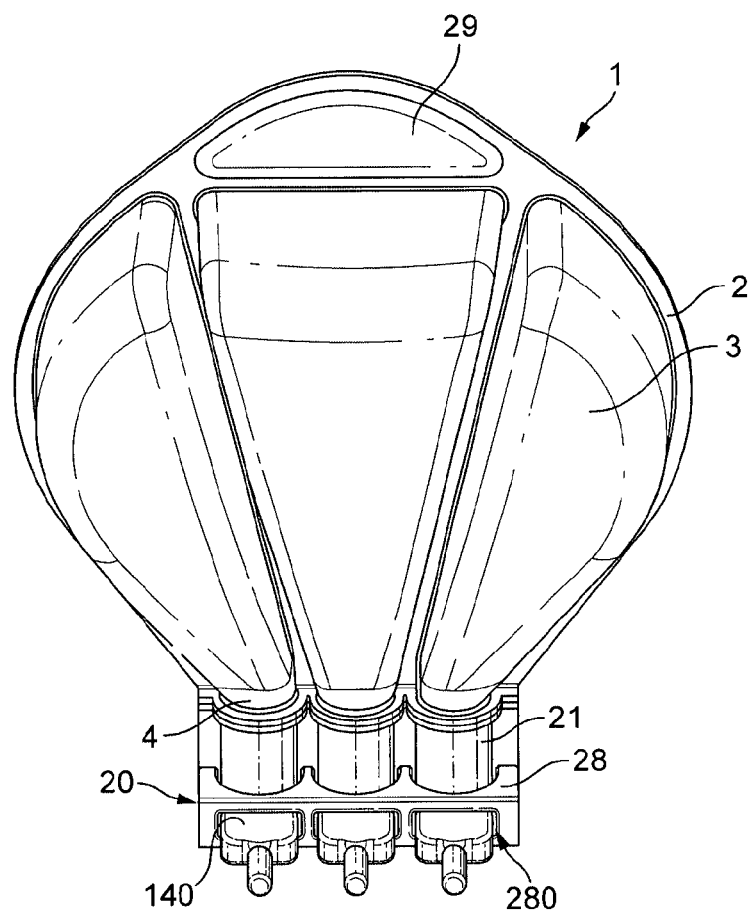
FIG. 8a shows a perspective top view of a card according to a seventh embodiment of the present invention including clamping means.
Figure 8B:
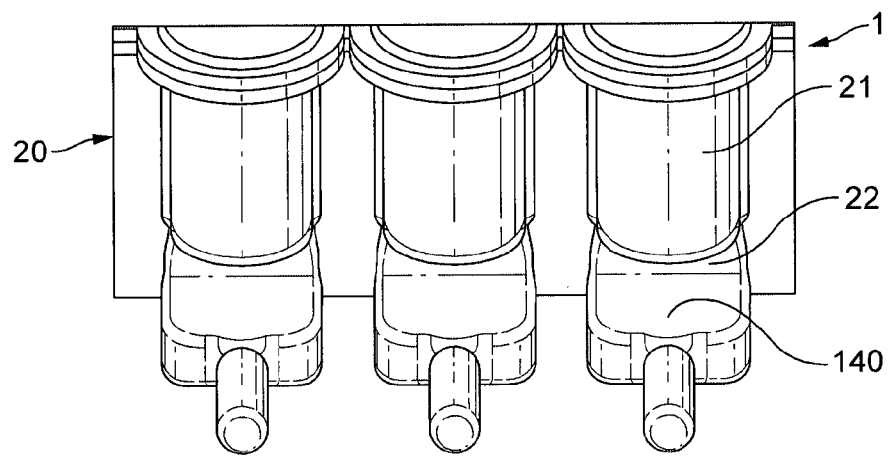
FIG. 8b shows a perspective top view of a functional portion of the card according to FIG. 8a, FIG. 8c shows a perspective bottom view of the portion depicted in FIG. 8b.
Figure 8C:
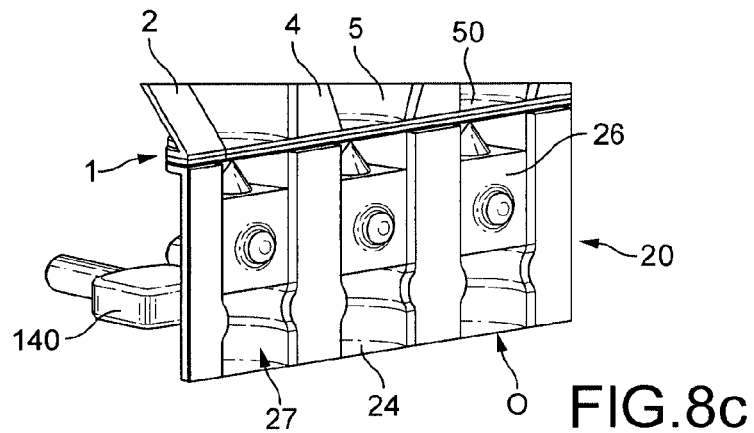
Figure 9A:
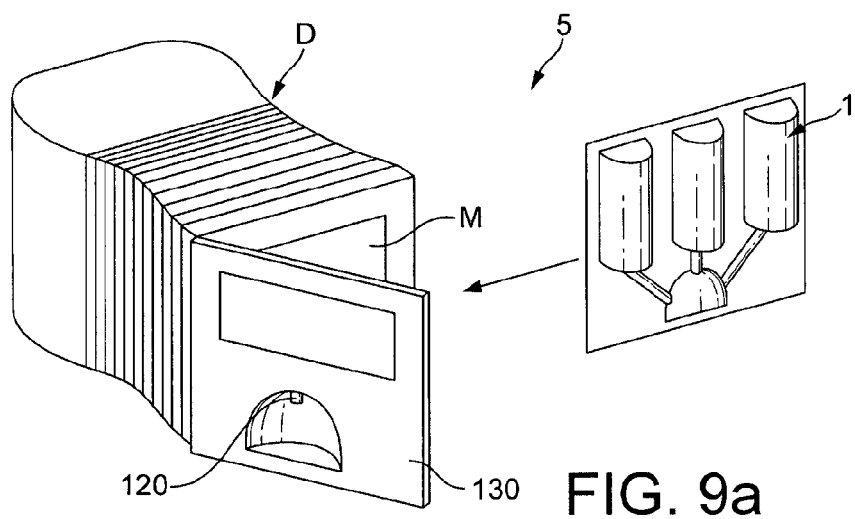
FIG. 9a shows a perspective view of a food and beverage producing system according to the present invention having a food and beverage preparation device according to an embodiment of the present invention.
Figure 9B:
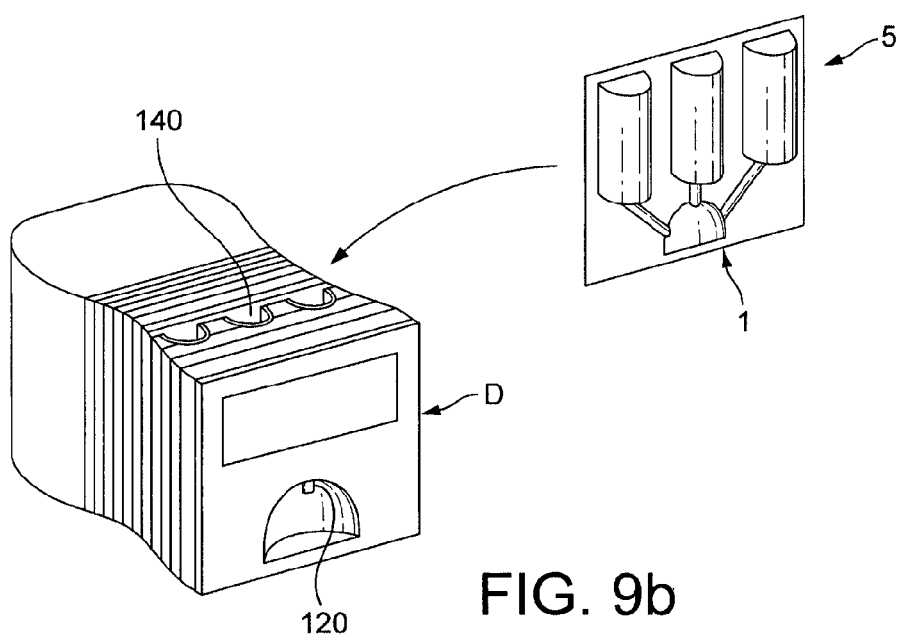
FIG. 9b shows a perspective view of a food and beverage producing system according to the present invention having a food and beverage preparation device according to another embodiment of the present invention.
Figure 10A:
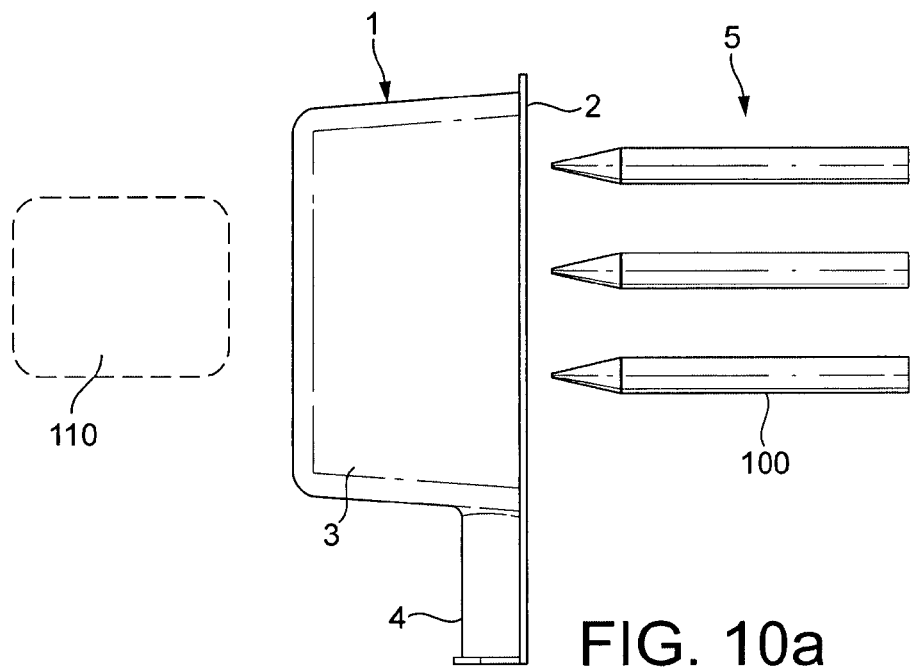
FIG. 10a shows a schematic side view of a food and beverage producing system according to the present invention having a card according to FIG. 1a, FIG. 10b shows a schematic side view of a food and beverage producing system according to the present invention having a card according to FIG. 3a, FIG. 11a shows a perspective bottom view of a food and beverage producing system according to the present invention having a card according to FIG. 7a and dispensing members of a food and beverage preparation device.
Figure 10B:
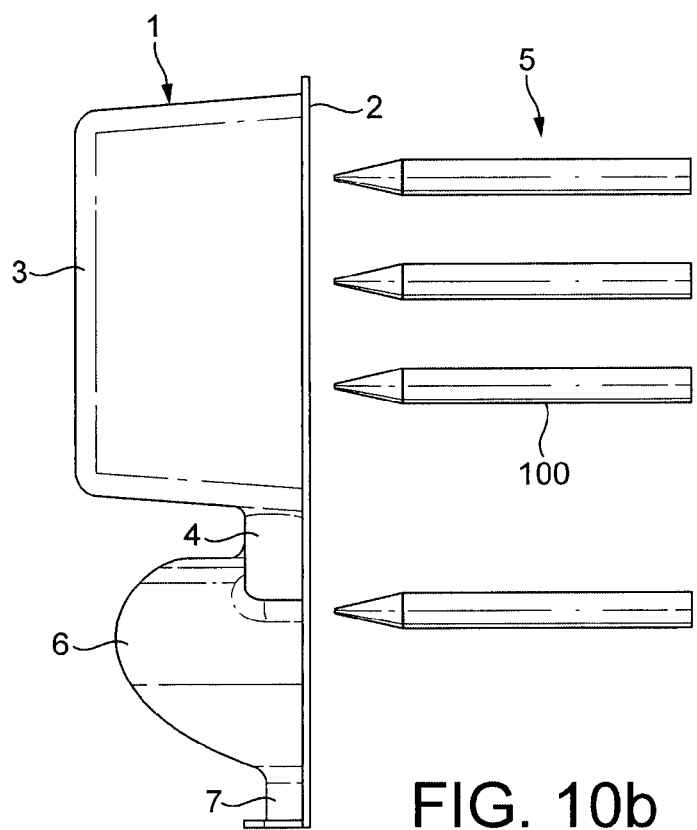

Also with respect to the card 1 as shown in FIGS. 6a, 7a and 8a, the card 1 can also comprise an area 29 for providing a branding or information about the ingredients of the card 1 or the product or instructions for using the card 1 or the like. Said area 29 is preferably a part of the base portion 2, particularly a lateral extension thereof. The information can be provided in a format readable by the machine, e.g. in a barcode, on an RFID tag, etc., so that it prepares automatically a product according to a specific protocol.

It is to be understood that the number of compartments 3, mixing chambers 6, discharging portions 4, 7 and channels 21 as well as their arrangement on the respective base portion 2, 23 and with respect to each other is not limited by the invention. Further, all the processing members can be combined in any desired way. It is also possible that some of the discharging portions 4 extend from the respective compartment 3 towards and up to an outlet O of the card 1 while other channels 4 of the card 1 extend to one or a plurality of mixing chambers 6 from which at least one mixing channel 7 extends to another mixing chamber 6 or to an outlet O of the card 1. The cards 1 of all embodiments can be provided with a dispensing member 20 as described with respect to FIGS. 6 to 8.

The dispensing means of the production device D can be a fluid injection means 100 (see FIGS. 10a and 10b) selectively moveable to enter the recesses. In this regard, the fluid injection means 100 can be designed to enter the compartments 3 and/or the mixing chamber 6 for injecting gases or liquids (e.g. water) for dissolving and later dispensing the ingredients. The fluid injection means 100 can also be designed to enter the channels 4, 7 for injecting gases (e.g. air) to foam the ingredients or (intermediate) products passing the respective channels 4, 7 in which a static mixer 8 is preferably provided.

Figure 11A:
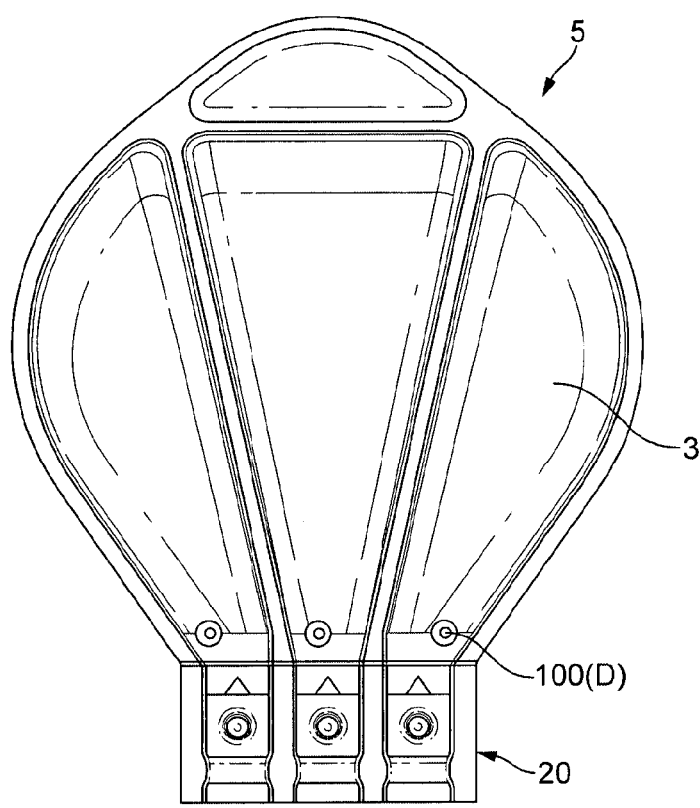
FIG. 11b shows a schematic side and top view of a dispensing member.
Figure 11B:
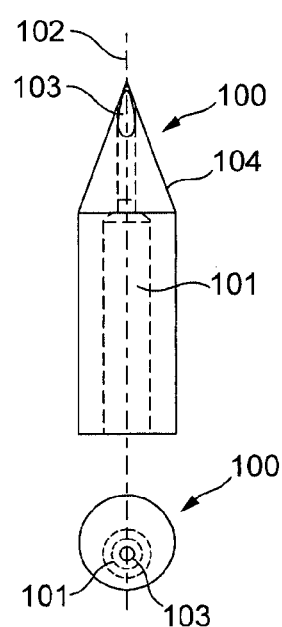

With respect to FIG. 11a, a system S is (schematically) shown having a card 1 as well as fluid injection means 100. As can be clearly seen, the fluid injection means 100 are provided (inserted) in the compartments 3 and close to an outlet thereof, i.e. close to the discharge portions 4. Further, the fluid injection means 100 are offset to a longitudinal axis of the respective discharge portion 4 in a side view. Hence, maximum turbulence can be obtained inside the compartment 3 to perform an sufficient product mixing and dissolution. FIG. 11b shows the characteristics of a fluid injection means 100 being formed as an injection needle. As can be clearly seen, the fluid channel 101 is in parallel to but offset from the longitudinal axis 102 of the fluid injection means 100. Hence, the injection opening 103 of the fluid channel 101 mainly opens to a side of the tapered end 104 of the fluid injection means 100 thus avoiding the injected fluid to directly escape via the discharge portions 4 but obtain maximum turbulences within the compartment 3. It is to be understood that said fluid injection means 100 can also be used to inject fluid into the mixing chamber 6, wherein said fluid injection means 100 is then placed in a similar way close to (the outlet to) the further discharge portion 7. However, the invention is not limited to said fluid injection means 100 or its piercing position with respect to the card 1.

Particularly in case the compartments 3 or even the mixing chamber 6 are made of a flexible material, an actuator or pusher means 110 (e.g. a push actuator; see FIG. 10a) can be provided as a dispensing means to selectively flatten the respective compartments 3 or mixing chamber 6 to thus squeeze out and dispense the ingredients from the respective compartment 3/mixing chamber 6.

Further, a regulating means (not shown) can be provided as the dispensing means which can be selectively inserted through the sealing member 5, 24 of the card 1 or the dispensing member 20 into a discharge portion 4, 7 or channel 21 for at least partially blocking the flow of ingredients or (intermediate) products through the respective discharge portion 4, 7 or channel 21. When penetrating the sealing member 5, 24, the latter forms a sealing for the regulating means to avoid leakage.

Moreover, the dispensing means can also comprise a clamping means (140) for selectively clamping the channels 21 of the dispensing member 20 extending from the base portion 2 to control the flow of ingredients to be dispensed.

As already described above, the beverage production device D can also comprise an actuator means for moving the flow controlling element 9, 10, 26 (see also FIG. 2b, reference numeral 51) along the plane of the respective base portion 2, 23 of the card 1.

The beverage production device D can further comprise a controlling means for selectively controlling the dispensing members and/or piercing means 9, 26 and/or piercing element 10.

According to a preferred embodiment, the beverage production device D comprises an outlet 120 which is fluidly connected to the discharge portions 4, 7 or channels 21 of the dispensing member 20 thus allowing an accurate dispensing of the product.

Moreover, the beverage production device D further comprises a heating and/or cooling means adapted to be brought into contact with the card 1, preferably the recesses, particularly the compartments 3 and/or mixing chamber 3 thereof for selectively heating and/or cooling the card 1, preferably its contents like the ingredients, intermediate products and products. For this purpose, the card 1, preferably the sealing member 5 and/or the compartments 3 and/or the mixing chamber 6, are made of a heat conductive material like aluminum.

Additionally, a thermally conductive member, which shape is preferably adaptable to the shape of the outer surface of the card 1, can be placed between the heating and/or cooling means and the card 1 to enhance the heat exchange therebetween. The thermally conductive member can comprise a thermo-gel. Alternatively, the thermally conductive member can be used as the heating and/or cooling means. In the latter case, the gel or other conductive material of the thermally conductive member can be pre-heated or pre-cooled in a microwave or a freezer or the like. The heating and/or cooling means is thus preferably removably provided in the beverage production device D.

It is to be understood that the beverage production device D can comprise any desired combination of the features (dispensing means, actuator means, controlling means, heating and/or cooling means, etc.) presented herein. The system S thus provides a large flexibility in product preparation as any kind of fluid like water, steam, air and the like can be injected into the card 1 at different places of the sealing member 5 and the card 1 can be otherwise mechanically and/or thermally treated dependent on the desired product to be dispensed.

It is noted that the sealing members 5, 24 can also form as a sealing means for the fluid injection means 100, the regulating means and the actuation members 92, 13, 262 protruding though the respective sealing member 5, 24.

In the following, a method for producing a food or beverage is described.

In a first step, a card 1 according to the invention is provided. Said card 1 is then positioned in a card receiving member M of a production device D as, for instance, shown in FIGS. 9a and 9b. According to FIG. 9a, a door 130 can be opened and the capsule 1 can be put into a respective card receiving member M provided either on the door side or on the machine side. According to FIG. 9b, a slot 140 having the contour of the cart 1 is provided, preferably on a top portion of the device D, so that the card 1 can be inserted from said top portion by simply sliding the card 1 into the slot 140. The card 1 then slides into a production position due to gravity.

It is also possible that a production device D comprises more than one card receiving member M for receiving a corresponding number of capsules 1.

In a next step of the method, dispensing members as described above can be activated, preferably selectively activated dependent on the cartridge 1 used and the product to be dispensed, for interacting with the respective recesses (e.g. compartments 3, discharge portions or channels 4, 7, 21, mixing chamber 6).

As a result, the ingredients are dispensed (in a drained form or as an (intermediate) product) from the respective compartments 3 (or mixing chamber 6) via the discharge portions or channels 4 and/or 7 and/or 21 and finally from the card 1.

The step of activating dispensing members can comprise at least one of the following steps, which can be carried out sequentially or simultaneously depending on the desired product:

selectively moving a fluid injection means 100 to enter the compartments 3 and/or a mixing chamber 6 of the card 1 into which the discharge portions 4 extend, and injecting gases or liquids into the respective compartments 3 and/or mixing chamber 6 for dispensing the food or beverage ingredients;

selectively moving a fluid injection means 100 to enter the discharge portions or channels 4, 7, 21, and injecting gases when the dispensed ingredients pass the discharge portions 4, 7, preferably via a static mixer being provided in the discharge portions 4, 7 or even in the channels 21, to foam the ingredients;

selectively flatten the compartments 3 and/or mixing chamber 6 by means of an (push) actuator 110 to dispense the ingredients from the respective compartment 3 and/or mixing chamber 6;

selectively inserting a regulating means through the sealing member 5 into a discharge portion 4, 7 or channel 21 for at least partially blocking the flow of said ingredients through the respective discharge portion 4, 7 or channel 21; and/or selectively clamping channels following the discharge portions 4 of the card 1 or a further discharge portion or mixing channel 7 extending from the mixing chamber 6 and extending from the base portion 2 by means of a clamping means 104 to control the flow of ingredients to be dispensed.

To further control the fluid flow, actuator means are or can be brought into engagement with the actuation member 13, 92, 262 of the piercing means 9, 26 or piercing element 10 for moving the piercing means 9, 26 or piercing element 10 along the plane of the base portion 2 to pierce the respective sealing portion or closing means 50 and enable or block a fluid flow dependent on the relative position of the piercing means 9, 26 or piercing element 10 with respect to the channel 4, 7, 21.

Further, a heat and/or cooling means is or can be brought into contact with the card 1 in the described manner and can then be activated to heat/cool the ingredients of the card 1.

The invention claimed is:

1. A method for preparing a food or beverage product from food or beverage ingredients, the method comprising the steps of:

injecting a liquid into a card containing the food or beverage ingredients, the card comprising a substantially planar and rigid base portion, at least two ingredient compartments for storing the ingredients, and at least two discharge portions comprising a first discharge portion and a second discharge portion, each discharge portion comprising a channel, each discharge portion linked to one of the compartments and formed by recesses protruding from the plane of the base portion, at least one sealing member is provided on the base portion covering the compartments and the discharge portions on the base portion side of the card, the liquid is injected into the at least two ingredient compartments, the card is designed for insertion in a food and beverage preparation device to dispense the ingredients from the compartments via the discharge portions, the card comprising a flow-controlling element comprising an actuator in the discharge portions, and the actuator moves the flow-controlling element along the plane of the base portion of the card;

activating the channel of the first discharge portion to dispense a food or beverage prepared from a first compartment of the card; and activating the channel of the second discharge portion to dispense a second food or beverage prepared from a second compartment of the card.

2. The method of claim 1, wherein the card further comprises a mixing chamber, a first fluid injection member injects the liquid into the at least two ingredient compartments, and a second fluid injection member injects a gas or a liquid into the mixing chamber.

3. The method of claim 1, wherein the at least two discharge portions of the card extend from the respective ingredient compartments to a common mixing chamber, and an additional discharge portion extends from the mixing chamber along the plane of the base portion.

4. The method of claim 1, comprising directing the food or beverage ingredients through the at least two channels arranged in one or more of the at least two discharge portions and moveable therein, such that the food or beverage ingredients pass the one or more of the at least two discharge portions.

5. The method of claim 1, wherein the card further comprises a static mixer in at least one of the discharge portions.

6. The method of claim 5, further comprising foaming at least one of the food or beverage ingredients with the static mixer.

7. The method of claim 1, wherein the card is made of a heat conductive material.

8. The method of claim 7, further comprising contacting the card with a heating member.

\* \* \* \* \*